(12) United States Patent
Itkin et al.

(10) Patent No.: US 11,567,170 B2
(45) Date of Patent: Jan. 31, 2023

(54) CALIBRATION OF A RADAR SYSTEM USING PLURALITY OF PHASE SHIFTED OSCILLATOR SIGNALS

(71) Applicant: Infineon Technologies AG, Neubiberg (DE)

(72) Inventors: Grigory Itkin, Munich (DE); Michael Jung, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 293 days.

(21) Appl. No.: 16/850,605

(22) Filed: Apr. 16, 2020

(65) Prior Publication Data

US 2020/0341112 A1 Oct. 29, 2020

(30) Foreign Application Priority Data

Apr. 23, 2019 (DE) .......................... 102019110525.0

(51) Int. Cl.
*G01S 7/40* (2006.01)
*G01S 13/28* (2006.01)
(Continued)

(52) U.S. Cl.
CPC ............ *G01S 7/4008* (2013.01); *G01S 7/282* (2013.01); *G01S 7/354* (2013.01); *G01S 13/282* (2013.01); *G01S 13/347* (2013.01)

(58) Field of Classification Search
CPC ........ G01S 7/4008; G01S 7/282; G01S 7/354; G01S 13/282; G01S 13/347; G01S 2013/93275; G01S 7/4026; G01S 7/403; G01S 7/4078; G01S 13/003; G01S 13/87; G01S 7/028; G01S 13/931; G01S 13/343; (Continued)

(56) References Cited

U.S. PATENT DOCUMENTS 10,018,715 B2 7/2018 Steinhauer et al.
2017/0307729 A1* 10/2017 Eshraghi ............... G01S 7/2813
(Continued)

FOREIGN PATENT DOCUMENTS

DE 102010002004 A1 8/2011
DE 102013216970 A1 3/2015
(Continued)

*Primary Examiner* — Donald H B Braswell
(74) *Attorney, Agent, or Firm* — Harrity & Harrity, LLP (57) ABSTRACT

A method for calibrating a radar system includes generating an RF oscillator signal and distributing the RF oscillator signal to a plurality of phase shifters each providing a respective phase-shifted RF oscillator signal; receiving the phase-shifted RF oscillator signals by corresponding radar chips and radiating the phase-shifted RF oscillator signal via a first RF output channel of a first one of the radar chips; receiving a back-scattered signal by at least one RF input channel of each radar chip and generating a plurality of base-band signals by down-converting the received signals into a base band using the phase-shifted RF oscillator signals received by the corresponding radar chips; determining a phase for each base-band signal; and adjusting the phase shifts caused by the phase shifters such that the phases of the base-band signals match a predefined phase-over-antenna-position characteristic.

12 Claims, 8 Drawing Sheets

(51) Int. Cl.
*G01S 7/35* (2006.01)
*G01S 13/34* (2006.01)
*G01S 7/282* (2006.01)

(58) Field of Classification Search
CPC .. G01S 13/4454; G01S 13/584; G01S 7/4052; G01S 7/40; G01S 13/06; G01S 13/58
See application file for complete search history.

(56) References Cited

U.S. PATENT DOCUMENTS

| | | | |
|---|---|---|---|
| 2017/0336496 A1* | 11/2017 | Fujii | G01S 13/04 |
| 2018/0120427 A1 | 5/2018 | Comic et al. | |
| 2018/0267158 A1* | 9/2018 | Kishigami | G01D 5/249 |
| 2019/0131934 A1* | 5/2019 | Khalil | H04B 1/04 |
| 2019/0178983 A1* | 6/2019 | Lin | G01S 13/003 |
| 2020/0025899 A1 | 1/2020 | Starzer et al. | |

FOREIGN PATENT DOCUMENTS

| | | |
|---|---|---|
| DE | 102018117688 A1 | 2/2019 |
| DE | 102018207718 A1 | 11/2019 |

* cited by examiner

CALIBRATION OF A RADAR SYSTEM USING PLURALITY OF PHASE SHIFTED OSCILLATOR SIGNALS

RELATED APPLICATION

This application claims priority to German Patent No. 102019110525.0, filed on Apr. 23, 2019, which is incorporated herein by reference in its entirety.

FIELD

The present disclosure relates to the field of radar sensors, in particular to a novel concept of calibrating a radar system with multiple input and multiple output channels.

BACKGROUND

Radar sensors can be found in numerous sensing applications in which distances and velocities of objects are to be measured. In the automotive sector, there is an increasing demand for radar sensors that may be used in so-called advanced driver-assistance systems (ADAS). Examples of an advanced driver assistive system are "adaptive cruise control" (ACC) and "radar cruise control" systems. Such systems may be used to automatically adjust the speed of an automobile so as to maintain a safe distance from other automobiles driving ahead. Other examples of advanced driver assistive system are blind-spot monitors, which may employ radar sensors to detect other vehicles in the blind spot of a vehicle. Particularly autonomous cars may use numerous sensors, such as radar sensors, to detect and locate various objects in their surroundings. Information about the position and velocity of objects in the area of an autonomous car is used to help navigate safely.

Modern radar systems make use of highly integrated radio frequency (RF) circuits which may incorporate all core functions of an RF font-end of a radar transceiver in one single package (single chip transceiver). Such RF front-ends usually include, inter alia, a local RF oscillator (LO), power amplifiers (PA), low-noise amplifiers (LNA), and mixers. Frequency-modulated continuous-wave (FMCW) radar systems use radar signals whose frequency is modulated by ramping the signal frequency up and down. Such radar signals are often referred to as "chirp signals" or simply as "chirps". A radar sensor usually radiates sequences of chirps using one or more antennas, and the radiated signal is backscattered by one or more objects (referred to as radar targets) located in the "field of view" of a radar sensor. The backscattered signals (radar echoes) are received and processed by the radar sensor. The detection of the radar targets is usually accomplished using digital signal processing.

Modern FMCW radar systems may include multiple input and multiple output channels and are thus referred to as multiple input/multiple output (MIMO) systems. The RF front-ends of the radar systems may be distributed across a plurality of semiconductor chips, which are referred to as monolithic microwave integrated circuits (MMICs). Such radar systems are not only capable of measuring distances but also the respective velocities and azimuth angles (also referred to as Direction of Arrival, DoA, of the radar echoes). Particularly the angle measurement needs a calibration of the phases of the transmitted radar signal in order to obtain the desired accuracy. However, in radar systems with a plurality of radar MMICs phase calibration may entail some challenges that do not occur in single chip solutions.

SUMMARY

A method for calibrating a radar system is described herein. In accordance with one embodiment the method includes generating an RF oscillator signal and distributing the RF oscillator signal to a plurality of phase shifters each providing a respective phase-shifted RF oscillator signal. The method further includes receiving the phase-shifted RF oscillator signals by corresponding radar chips and radiating the phase-shifted RF oscillator signal via a first RF output channel of a first one of the radar chips. The radiated signal is back-scattered at a marker, which has a predetermined position relative to the antennas coupled to the radar chips. The method further includes receiving the back-scattered signal by at least one RF input channel of each radar chip and generating a plurality of base-band signals by down-converting, in the at least one RF input channel of each radar chip, the received signals into a base band using the phase-shifted RF oscillator signals received by the respective radar chips. The method further includes determining a phase for each base band signal and adjusting the phase shifts caused by the phase shifters such that the phases of the base band signals match a predefined phase-over-antenna-position characteristic.

Furthermore, a corresponding radar system is described. In accordance with one embodiment the system includes a master radar chip and a plurality of slave radar chips, wherein the slave radar chips each have one or more RF output channels coupled to respective transmit antennas and one or more RF input channels coupled to respective receive antennas. An RF oscillator is included in the master radar chip and configured to generate an RF oscillator signal. The system further includes a signal distribution circuit included in the master radar chip and configured to receive the RF oscillator signal from the RF oscillator, to distribute the RF oscillator signal to a plurality of phase shifters, which are configured impose a phase shift to the RF oscillator signal, and to output the phase shifted RF oscillator signals to the slave radar chips. The RF output channels of each slave radar chip are configured to radiate an RF radar signal that is based on the RF oscillator signal received by the respective slave radar chip. The system further includes a cover that has a marker with a predefined position relative to the transmit antennas and the receive antennas. The RF input channels of the slave radar chips are configured to receive RF radar signals back-scattered at the marker and to down-convert the received RF radar signals into a base band using the phase shifted RF oscillator signal received by the respective slave radar chips. In this way a base-band signal is generated for each RF input channel of each slave radar chip. The system further includes a controller circuit configured to determine a phase of each one of the base band signals and to adjust the phase shifts caused by the phase shifters of the signal distribution circuit such that the phases of the base band signals match a predetermined phase-over-antenna-position characteristic.

BRIEF DESCRIPTION OF THE DRAWINGS

The invention can be better understood with reference to the following drawings and descriptions. The components in the figures are not necessarily to scale; instead emphasis is placed upon illustrating the principles of the invention. In the figures, like reference numerals designate corresponding parts. In the drawings:

FIGS. 7 and 8 illustrate one example of a phase-over-antenna position characteristic, which is used for calibrating the radar system of FIG. 6, where FIG. 7 illustrates the situation before the first calibration step and FIG. 8 illustrates the situation after the first calibration step.

DETAILED DESCRIPTION

Figure 1:
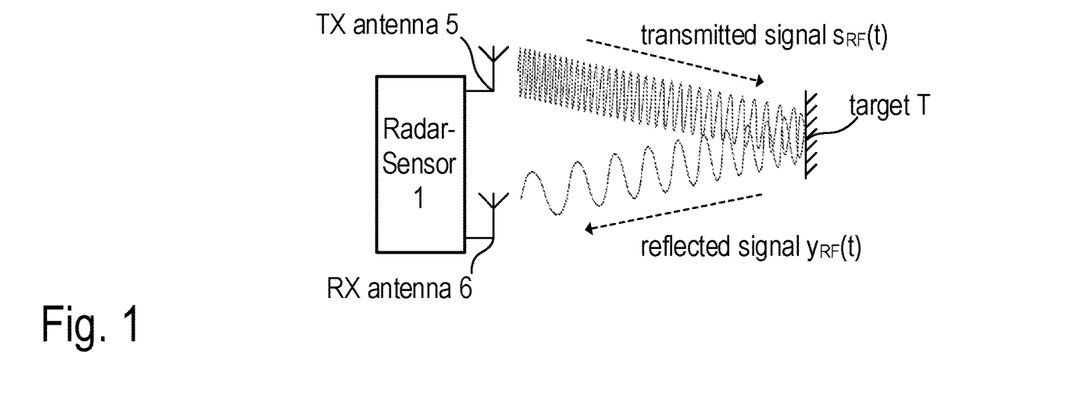
FIG. 1 is a sketch illustrating the operating principle of an FMCW radar system for distance and/or velocity measurement.
Figure 3:
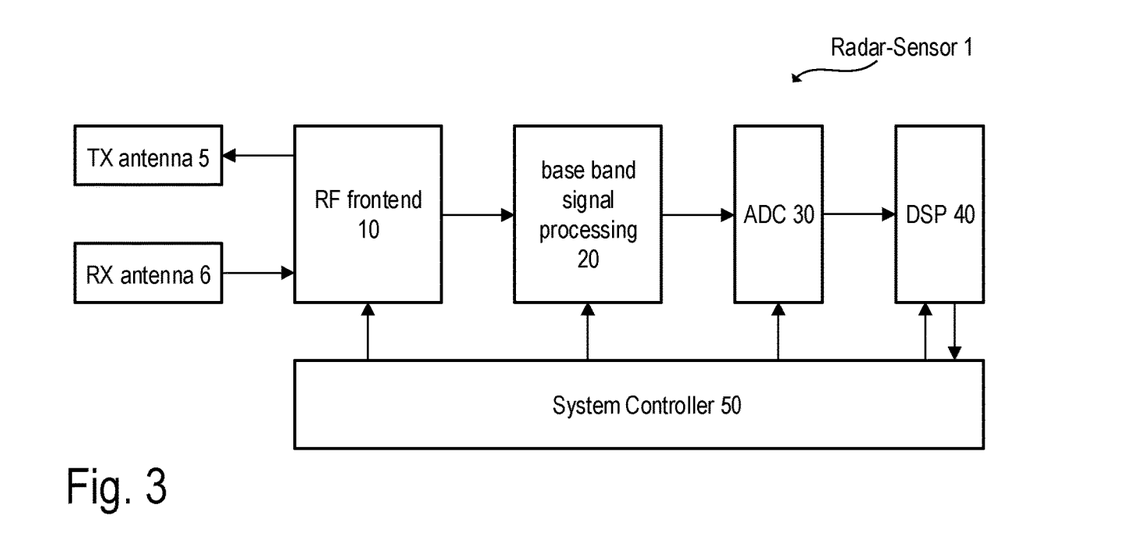
FIG. 3 is a block diagram illustrating the basic structure of an FMCW radar device.

FIG. 1 illustrates a conventional FMCW radar sensor 1. In the present example, separate transmission (TX) and reception (RX) antennas 5 and 6, respectively, are used (bistatic or pseudo-monostatic radar configuration). However, it is noted that a single antenna can be used, so that the reception antenna and the transmission antenna will be physically the same (monostatic radar configuration). The transmission antenna 5 (quasi-) continuously radiates a radio frequency (RF) signal $s_{RF}(t)$, which is frequency-modulated, for example, by a saw-tooth-shaped signal. When the radiated signal $s_{RF}(t)$ is back-scattered at an object T, which may be located in the field of view of the radar system, the back-scattered RF signal $y_{RF}(t)$ is received by the reception antenna 6. The object T is usually referred to as "radar target". In a more general example, several targets may be in the field of view of a radar sensor, and an antenna array may be used instead of a single RX antenna. Similarly, an antenna array may be used instead of a single TX antenna. Using multiple RX and TX antennas in a multi-channel radar system allows for the measurement of the angle of incidence of a radar echo (azimuth angle), usually referred to as direction of arrival (DoA). Measurement of the direction of arrival is important for many applications, and thus most radar sensors will make use of antenna arrays. To keep the drawings simple, only one TX antenna and one RX antenna are shown in FIGS. 1 and 3. It is understood that the concepts described with reference to these figures are readily applicable to radar sensors with antenna arrays.

Figure 2:
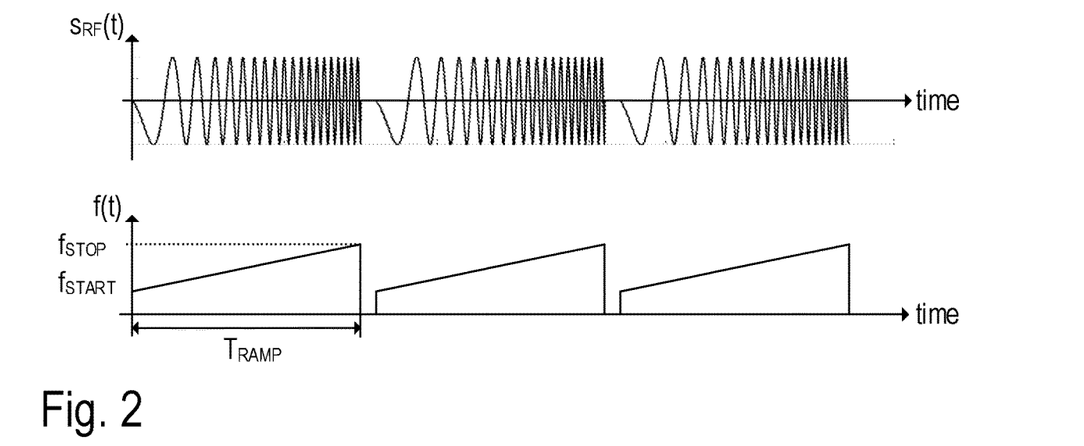
FIG. 2 includes two timing diagrams illustrating the frequency modulation of the RF signal used in FMCW radar systems.

FIG. 2 illustrates the mentioned conventional frequency-modulation of the signal $s_{RF}(t)$. As shown in the top diagram of FIG. 2, the signal $s_{RF}(t)$ is composed of a sequence of "chirps", i.e. sinusoidal waveforms with increasing (up-chirp) or decreasing (down-chirp) frequency. In the present example, the instantaneous frequency $f_{LO}(t)$ of a chirp increases linearly from a start frequency $f_{START}$ to a stop frequency $f_{STOP}$ within a defined time span TRAMP (see bottom diagram of FIG. 2). Such a chirp is also referred to as a linear frequency ramp. A frequency-modulated signal with three identical linear frequency ramps is illustrated in FIG. 2. It is noted, however, that the parameters $f_{START}$, $f_{STOP}$, $T_{CHIRP}$ as well as the pause between the individual frequency ramps may vary dependent on the actual implementation of the radar device 1 and may also vary during operation of the radar device.

FIG. 3 is a block diagram that illustrates an exemplary structure of radar sensor 1. Accordingly, at least one transmission antenna 5 (TX antenna(s)) and at least one reception antenna 6 (RX antenna(s)) are connected to an RF frontend 10, which may be integrated in a semiconductor chip, usually referred to as monolithic microwave integrated circuit (MMIC). The RF frontend 10 may include all the circuit components needed for RF signal processing. Such circuit components may include, for example, a local oscillator (LO), RF power amplifiers, low noise amplifiers (LNAs), directional couplers such as rat-race-couplers and circulators, and mixers for the down-conversion of RF signals (e.g. the received signal $y_{RF}(t)$, see FIG. 1) into the base-band or IF-band. As mentioned, antenna-arrays may be used instead of single antennas. The depicted example shows a bistatic (or pseudo-monostatic) radar system, which has separate RX and TX antennas. In case of a monostatic radar system, a single antenna or a single antenna array may be used for both, receiving and transmitting electromagnetic (radar) signals. In this case a directional coupler (e.g. a circulator) may be used to separate RF signals to be transmitted to the radar channel from RF signals received from the radar channel.

In the case of an FMCW radar sensor, the RF signals radiated by the TX antenna 5 may be in the SHF (Super High Frequency) or the EHF (Extremely High Frequency) band, e.g. in the 24 GHz ISM band or in the range of e.g. about 76-81 GHz in automotive applications. As mentioned, the RF signal received by the RX antenna 6 includes the radar echoes, i.e. the signals that have been back-scattered at the radar target(s). The received RF signal $y_{RF}(t)$ is down-converted into the base-band and further processed in the base-band using analog signal processing (see FIG. 3, base-band signal processing chain 20), which basically includes filtering and amplification of the base-band signal and thus determines the bandwidth of the received signal. The base-band signal is finally digitized using one or more analog-to-digital converters 30 and further processed in the digital domain (see FIG. 3, digital signal processing chain implemented, e.g., in digital signal processor 40). The overall system is controlled by a system controller 50, which may be at least partly implemented using a processor executing appropriate software/firmware. The processor may be included, e.g. in a microcontroller, a digital signal processor, or the like. The digital signal processor 40 (DSP) may be part of the system controller 50 or separate therefrom. The RF frontend 10 and the analog base-band signal processing chain 20 and optionally the also the ADC 30 as well as part of the digital signal processing may be integrated in a single MMIC. However, the components may be distributed among two or more integrated circuits.

Figure 4:
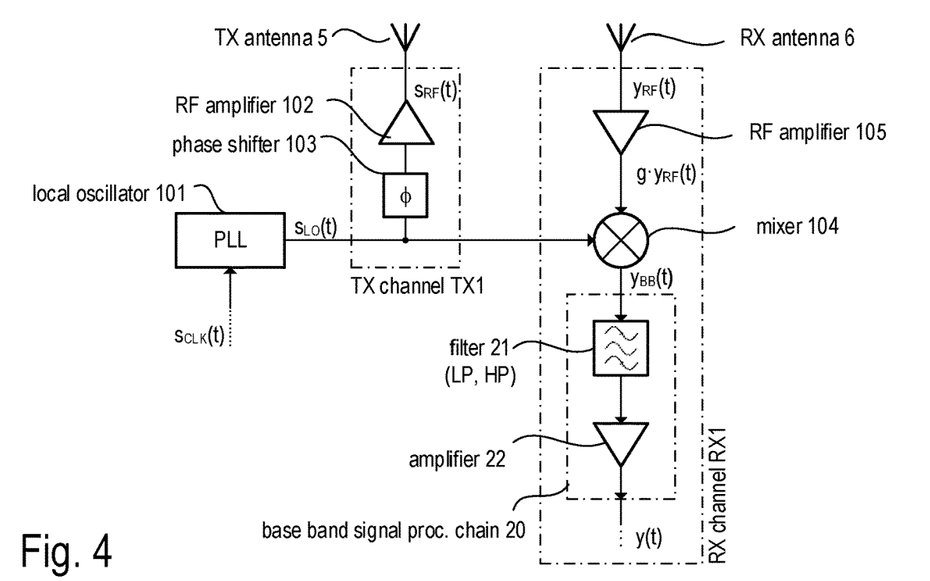
FIG. 4 is a circuit diagram illustrating one example of an analog RF frontend, and analog base-band signal processing.

FIG. 4 illustrates one exemplary implementation of the RF frontend 10, which may be included in the radar system shown in FIG. 3. It is noted that FIG. 4 is a simplified circuit diagram illustrating the basic structure of an RF frontend. Actual implementations, which may heavily depend on the application, are of course more complex and may include several RX and/or TX channels in a single MMIC. The RF frontend 10 includes a local oscillator 101 (LO) that generates a RF signal $s_{LO}(t)$, which may be frequency-modulated as explained above with reference to FIG. 2. The signal $s_{LO}(t)$ is also referred to as LO signal. Usually, the local oscillator 101 includes a phase-locked loop.

The LO signal $s_{LO}(t)$ is processed in the transmission signal path as well as in the reception signal path. The transmission signal $s_{RF}(t)$ (outgoing radar signal), which is radiated by the TX antenna 5, is generated by amplifying the LO signal $s_{LO}(t)$, e.g., using an RF power amplifier 102. The output of the amplifier 102 is coupled to the TX antenna 5. The RF signal processing chain coupled between the LO and a particular TX antenna is referred to as TX channel or RF output channel, which is labelled TX1 in the example of FIG. 4. In order to adjust the phase of the outgoing radar signal $s_{RF}(t)$ the respective output channel TX1 includes a phase shifter 103, which may be coupled between an input circuit node of the output channel TX1 (at which the LO signal $s_{LO}(t)$ is received) and the RF amplifier 102. Phase shifter 103 may also be placed after RF amplifier 102 or may be a part of RF amplifier 102.

The received signal $y_{RF}(t)$ (incoming radar signal), which is provided by the RX antenna 6, is directed to a mixer 104. In the present example, the received signal $y_{RF}(t)$ (i.e. the antenna signal) is pre-amplified by RF amplifier 105 (gain g), so that the mixer receives the amplified signal $g \cdot y_{RF}(t)$ at its RF input port. The mixer 104 further receives the LO signal $s_{LO}(t)$ at its reference input port and is configured to down-convert the amplified signal $g \cdot y_{RF}(t)$ into the base band. The resulting base-band signal at the mixer output is denoted as $y_{BB}(t)$. The base-band signal $y_{BB}(t)$ is further processed by the analog base band signal processing chain 20 (see also FIG. 3), which basically includes one or more filters (e.g. a band-pass 21 or a combination of high pass and low pass filters) to remove undesired side bands and image frequencies as well as one or more amplifiers such as amplifier 22. The analog output signal, which may be supplied to an analog-to-digital converter (cf. FIG. 3), is denoted as y(t). Various techniques for the digital post-processing of the digitized output signals (digital radar signal) are as such known (e.g. Range Doppler Analysis) and thus not further explained herein. The RF signal processing chain coupled between a particular RX antenna and the ADC that provides the respective digital base band signal is referred to as RX channel or RF input channel, which is labelled RX1 in the example of FIG. 4.

In the present example, the mixer 104 down-converts the RF signal $g \cdot y_{RF}(t)$ (amplified antenna signal) into the base band. The respective base band signal (mixer output signal) is denoted by $y_{BB}(t)$. The down-conversion may be accomplished in a single stage (i.e. from the RF band into the base band) or via one or more intermediate stages (from the RF band into an intermediate frequency band and subsequently into the base band).

Figure 5:
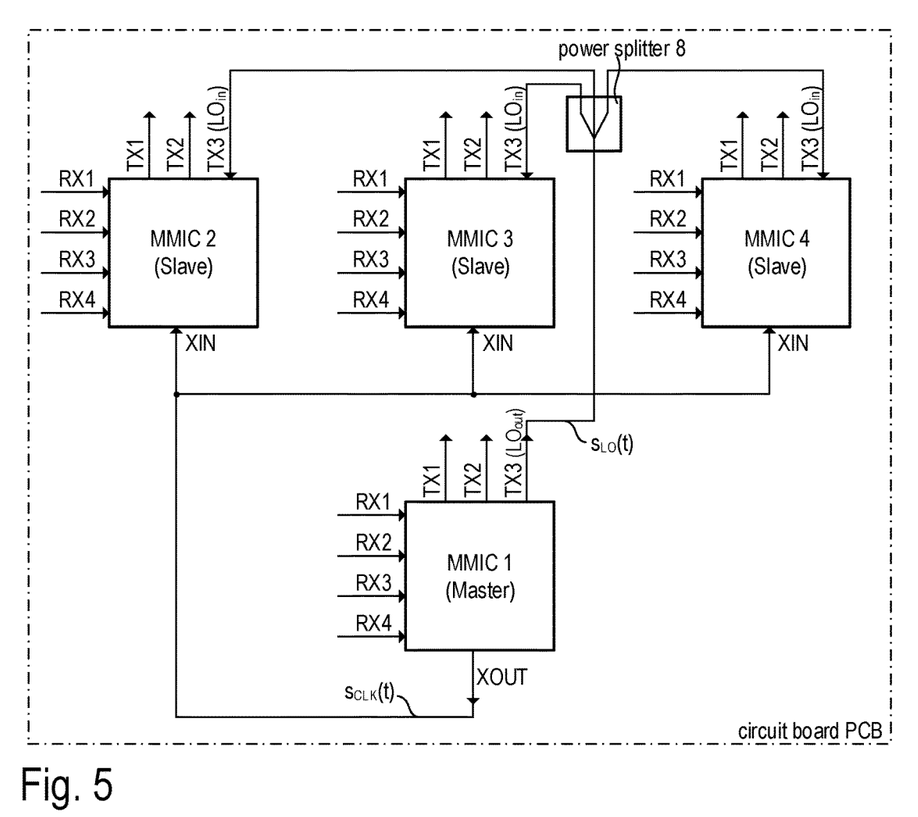
FIG. 5 illustrates one example of a MIMO radar system that includes several cascaded MMICs.

FIG. 5 is a block diagram illustrating a general example of a MIMO radar system with a plurality of coupled (cascaded) MMICs. In the depicted example, four MMICs 1, 2, 3, and 4 are arranged on a carrier, e.g. a circuit board (printed circuit board PCB). Each one of the MMICs may include several RF input channels RX1, RX2, RX3, RX4 as well as several RF output channels TX1, TX2, TX3. For a proper operation of the radar system it is important that the LO signals used by the individual MMICs 1, 2, 3, and 4 are coherent. For this reason, the LO signal $s_{LO}(t)$ is generated in one MMIC 1—the master MMIC—and distributed to the other MMICs 2, 3, and 4, referred to as slave MMICs. In the depicted example, the LO signal $s_{LO}(t)$ is output at an LO output $LO_{out}$ of the master MMIC 1 and directed to an input of an RF power divider 8 (e.g. implemented as a Wilkinson power divider); the outputs of the RF power divider 8 are coupled with the respective LO inputs $LO_{in}$ of the slave MMICs 2, 3, and 4. Dependent on the chip package, the LO inputs $LO_{in}$ and the LO output $LO_{out}$ may be implemented as pins, solder balls or the like. In particular examples the LO inputs $LO_{in}$ and the LO outputs $LO_{out}$ may be implemented by reconfiguring an output pin of output channel TX3. However, separate pins may be used as well as LO inputs $LO_{in}$ and the LO outputs $LO_{out}$.

In the depicted example, the outputs of the TX channels TX1 and TX2 of each MMIC may be coupled to respective transmission antennas. Similarly, the inputs of the RX channels RX1, RX2, RX3, and RX4 of each MMIC may be coupled to respective reception antennas. The connection between the MMICs 1, 2, 3, and 4 and the power divider 8 may be implemented, for example by (e.g. differential) strip lines arranged on the circuit board PCB. Also the power divider 8 itself may be implemented using strip lines arranged on the circuit board PCB. It should be noted that all MMICs may include local oscillators, which are, however, not used in those MMICs that are configured as slave MMICs. During normal radar operation the LO signal is generated in the master MMIC 1 and distributed to the slave MMICs, which ensures that the LO signals received by and processed in the different MMICs are coherent.

In the example of FIG. 5 the master MMIC 1 generates the LO signal $s_{LO}(t)$ based on a (system) clock signal $s_{CLK}(t)$, which may be generated by a clock generator included in the master MMIC 1. Alternatively, the clock signal $s_{CLK}(t)$ may be generated by the system controller (cf. FIG. 3, not shown in FIG. 5) or by a separate clock generator. In the present example, the clock signal $s_{CLK}(t)$ is also output by the master MMIC 1 (clock output XOUT) and distributed to the slave MMICs 2, 3, and 4 (clock inputs XIN). Usually, the clock signal has a frequency of several MHz (e.g. 500 MHz), whereas the LO signal usually has a frequency of several GHz (e.g. 77 GHz). In some applications the master MMICs 1 may be configured to provide the clock signal $s_{CLK}(t)$ and the LO signal sLO(t) to the slave MMICs, whereby the RF input and output channels of the master MMIC are unused. In this case, the main purpose of the master MMIC is signal generation and distribution. Although a system controller is not shown in FIG. 5, it is nevertheless present. The system controller may be connected to the MMICs 1, 2, 3, and 4 via digital high-speed link (e.g., Low Voltage Differential Signaling, LVDS or Serial Peripheral Interface, SPI) which is capable of transmitting the digitized base band signals provided by the individual RX channels to the system controller. In this case, the digital signal processing would be centralized in the system controller. However, as already mentioned, at least part of the digital signal processing may be done in the MMICs so that only processed data, such as, for example, calculated phase values, Range-Doppler-Maps, etc. needs to be transmitted to the system controller. As mentioned, the actual implementation may depend heavily on the specific application.

Figure 6:
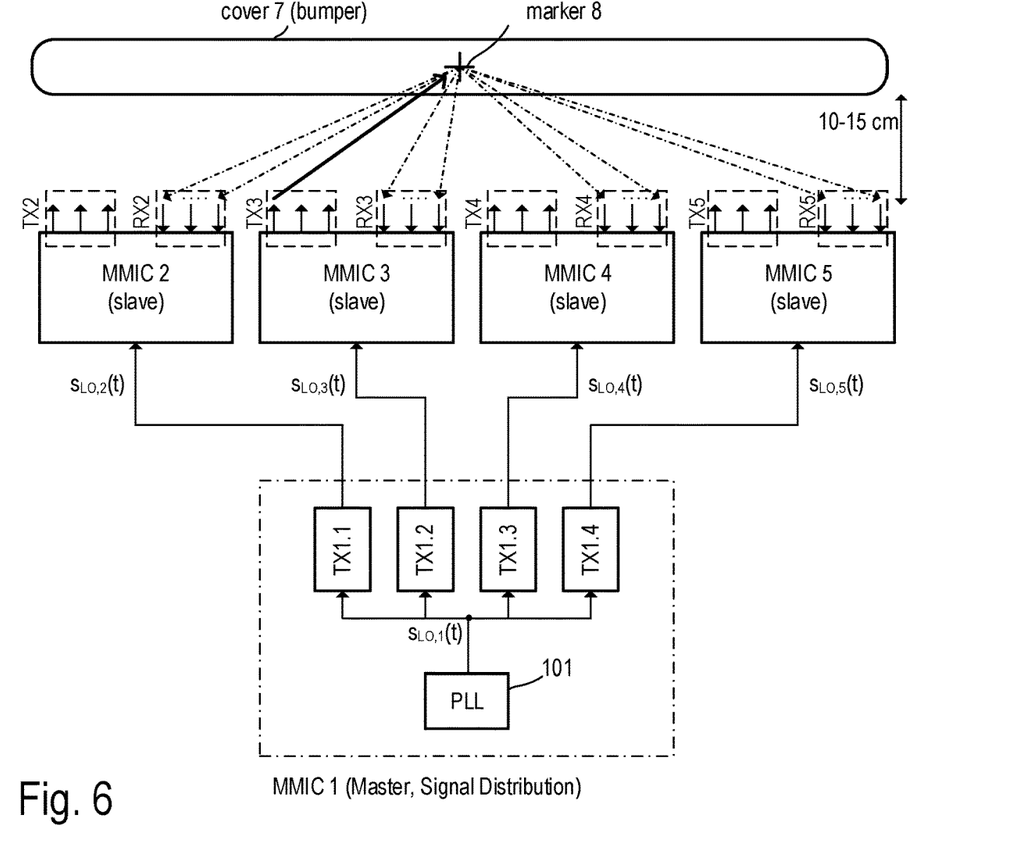
FIG. 6 illustrates one example of a MIMO radar system that includes several cascaded MMICs (master and slaves) and allows for an effective calibration.

FIG. 6 illustrates a further example of a cascaded MIMO radar system, which allows a comparably easy on-line (out of factory) calibration (and fast recalibration if needed) of the phases of the RF radar signals output by the TX channels of the individual MMICs as well as the phases of the LO signals used by the RX channels of the individual MMICs. In this example, the master MMIC 1 basically operates as an LO signal generation and distribution circuit, whereas the RX channels and TX channels coupled to the respective transmit and receive antennas are included in the slave MMICs 2, 3, 4, and 5.

In the example of FIG. 6, the master MMIC 101 includes a local oscillator 101, which his usually implemented by a voltage controlled oscillators connected in a phase-locked look. The resulting LO signal $s_{LO,1}(t)$ is provided to the master MMIC's output channels TX1.1, TX1.2, TX1.3, and TX1.4. The RF output signals of the output channels TX1.1, TX1.2, TX1.3, and TX1.4 are configured to output LO signals $s_{LO,2}(t)$, $s_{LO,3}(t)$, $s_{LO,4}(t)$, and, respectively, $s_{LO,5}(t)$, which are basically, phase shifted and amplified versions of the LO signal $s_{LO,1}(t)$. The LO signals $s_{LO,2}(t)$, $s_{LO,3}(t)$, $s_{LO,4}(t)$, and $s_{LO,5}(t)$ are routed (e.g. via strip lines) to the LO inputs of the slave MMICs 2, 3, 4, and 5, respectively. The master MMIC's output channels TX1.1, TX1.2, TX1.3, and TX1.4 may be implemented similar to the TX channel in the example of FIG. 4. However, the gains of the amplifiers used in the output channels TX1.1, TX1.2, TX1.3, and TX1.4 may be lower than the gains used in output channels that are connected to an antenna.

In the present example, each one of the slave MMICs 2, 3, 4, and 5 includes a plurality of RX and TX channels denoted as RX2.1, RX2.2, RX2.3 (collectively referred to as RX2 channels), TX2.1, TX2.2, TX2.3 (collectively referred to as TX2 channels), RX3.1, RX3.2, RX3.3 (collectively referred to as RX3 channels), TX3.1, TX3.2, TX3.3 (collectively referred to as TX3 channels), etc. The RF outputs of the TX channels and the RF inputs of the RX channels are connected to respective transmission and reception antennas (indicated by respective arrows in FIG. 6). The TX channels TX2, TX3, TX4, and TX5 and the RX channels RX2, RX3, RX4, and RX5 may be implemented as the corresponding TX and RX channels in the example of FIG. 4.

Further illustrated in FIG. 6 is a cover 7 behind which the radar system is installed. In case of an automotive application the cover may be a bumper of a car or the like. The cover 7 includes a marker 8 that has a predefined position relative to the transmit antennas and the receive antennas connected to the slave MMICs 2, 3, 4, and 5. The marker may be a small piece of metal, at which the RF radar signals, which are radiated by the transmission antennas, are reflected/back-scattered. The marker 8 has a different (e.g. a higher) reflection coefficient than the surface of the cover adjacent to the marker 8. The marker 8 may be embedded in or otherwise attached to the cover 7. Alternatively, the marker 8 may also be realized as a hole in the cover 7. Radar echoes caused by the marker 8 will be "seen" by the radar system as a radar target at a comparably short distance (e.g. 10-15 cm) to the antennas.

As mentioned above, it may be important for a precise measurement that the phases of the outgoing radar signals (transmitted by the respective TX antennas) as well as the phases of the "local" LO signals $s_{LO,2}(t)$, $s_{LO,3}(t)$, $s_{LO,4}(t)$, and $s_{LO,5}(t)$ used by the slave MMICs (and thus by the RX channels integrated therein) have a defined relation to each other. As the phases of the local LO signals and the phases of the transmitted RF signals may vary due to tolerances of the circuit components integrated in the MMICs and may further be subject to a temperature drift, a calibration and/or periodically recalibration of the phases may be performed to achieve the desired phase relations. The structure of the radar system of FIG. 6 allows for a comparably easy and efficient calibration procedure, which will be discussed in the following.

For the further discussion it is assumed that the local oscillator 101 of the master MMIC 1 generates a frequency modulated LO signal $s_{LO,1}(t)$, which can be modelled according to the following equation $$s_{LO,1}(t)=A_0 \cdot \sin(2\pi f_0 \cdot t + \pi k \cdot t^2 + \varphi_0), \qquad (1)$$

wherein, without loss of generality, the amplitude A can be set to one and the phase $\varphi_0$ can be set to zero for the following discussion, i.e. $s_{LO,1}(t)=\sin(2\pi f_0 \cdot t + \pi k \cdot t^2)$. It is noted that the instantaneous frequency of the LO signal $s_{LO,1}(t)$ is $f_{LO}=f_0+k \cdot t$. That is, the frequency $f_{LO}$ is increasing linearly (linear frequency ramp, up-chirp). Each one of the RF output channels TX1.1, TX1.2, TX1.3, and TX1.4 of the master MMIC 1 includes a phase shifter with an adjustable phase shift $\Delta\varphi_{1.1}$, $\Delta\varphi_{1.2}$, $\Delta\varphi_{1.3}$, $\Delta\varphi_{1.4}$, respectively, and an amplifier (cf. FIG. 4, phase shifter 103, amplifier 102). Accordingly, the LO signals $s_{LO,2}(t)$, $s_{LO,3}(t)$, $s_{LO,4}(t)$, and $s_{LO,5}(t)$ output by the output channels TX1.1, TX1.2, TX1.3, and TX1.4 of the master MMIC 1 may be written as follows, wherein the gains of the amplifiers have been assumed to be one for the following discussion. That is, the LO signals arriving at the slave MMICs 2, 3, 4, and 5 are:

$$s_{LO,2}(t)=\sin(2\pi f_0 \cdot t + \pi k \cdot t^2 + \varphi_2 + \Delta\varphi_{1.1}), \qquad (2)$$

$$s_{LO,3}(t)=\sin(2\pi f_0 \cdot t + \pi k \cdot t^2 + \varphi_3 + \Delta\varphi_{1.2}), \qquad (3)$$

$$s_{LO,4}(t)=\sin(2\pi f_0 \cdot t + \pi k \cdot t^2 + \varphi_4 + \Delta\varphi_{1.3}), \qquad (4)$$

$$s_{LO,5}(t)=\sin(2\pi f_0 \cdot t + \pi k \cdot t^2 + \varphi_5 + \Delta\varphi_{1.4}), \qquad (5)$$

wherein the additional phases $\varphi_2$, $\varphi_3$, $\varphi_4$, and $\varphi_5$, are caused, inter alia, by the propagation delay between the master MMIC 1 and the respective slave MMIC 2, 3, 4, and 5 as well as by matching circuitry (not shown in the figures) and the amplifiers (and other active circuit components) included in the RF output channels TX1.1, TX1.2, TX1.3, and TX1.4 of the master MMIC 1.

For the following calibration process, one RF output channel of one of the slave MMICs is selected as a reference channel. In the example of FIG. 6 the output channel TX3.1 of slave MMIC 3 is chosen as reference channel. However, any other output channel could be selected instead. During a first part of the calibration, the phase-shifted LO signal $s_{LO,3}(t)$ is radiated via the antenna connected to the output of the reference channel TX3.1, the radiated RF signal is back-scattered at the marker 8, and the back-scattered echo signals are received by all reception antennas and the respective RX channels connected to the RX antennas.

Figure 7:
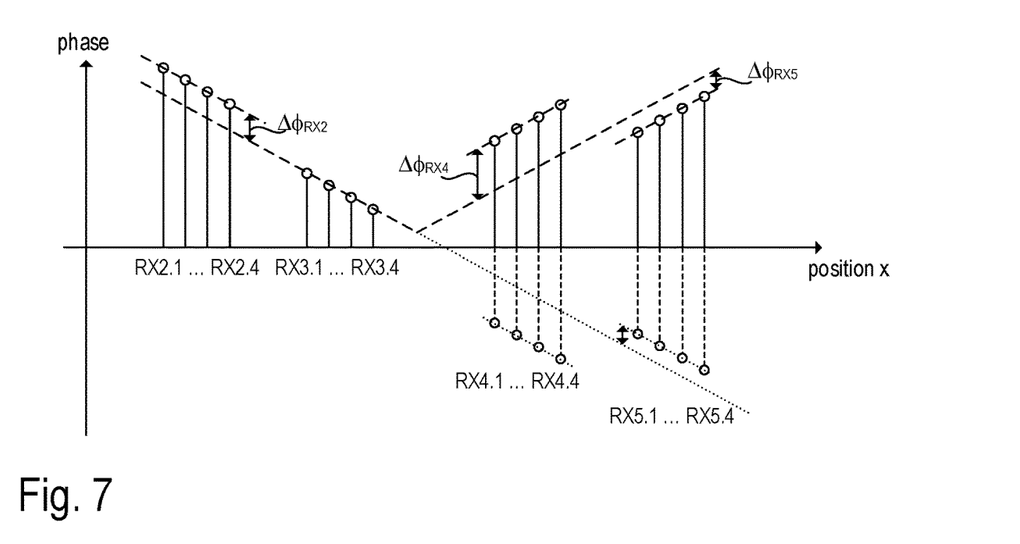
Figure 8:
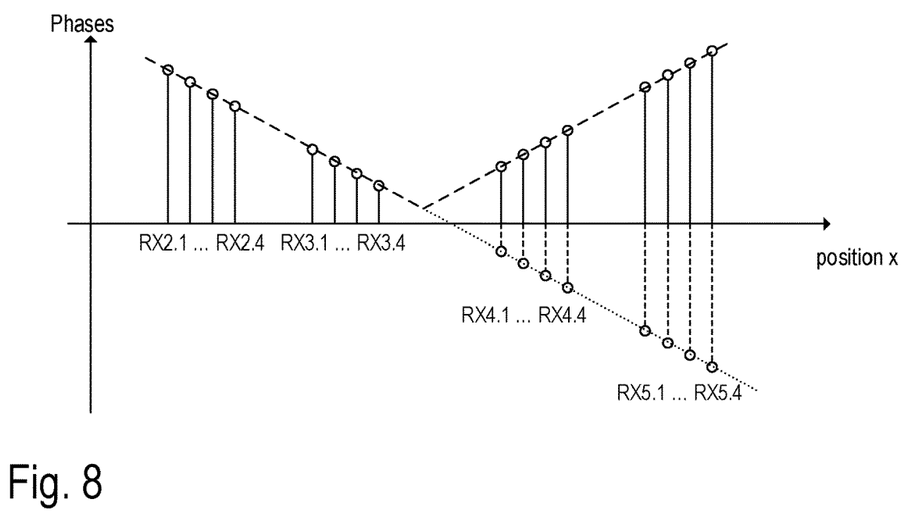

At the beginning of the calibration process all phase shifts effected by the phase shifters 103 included in the RF output channels are set to zero or any other defined default value (e.g. $\Delta\varphi_{1.1}=\Delta\varphi_{1.2}=\Delta\varphi_{1.3}=\Delta\varphi_{1.4}=0$). The phases of the (digitized) base-band signals provided by the RX channels RX2, RX3, RX4, and RX5 are determined, e.g. using a Fourier transform algorithm. FIG. 7 illustrates the phase of the base-band signals provided by the RX channels RX2.1, . . . , RX 2.4, RX3.1, . . . , RX3.4, RX 4.1, . . . , RX 4.4, and RX5.1, . . . , RX5.4 as a function of antenna position before the calibration, whereas FIG. 8 illustrates the corresponding phases after the calibration process. The phase-over-antenna position characteristic illustrated in FIG. 8 is a desired predefined characteristic for a specific radar system.

It may be a linear characteristic as is the case in the present example. However, the characteristic curve used for calibration is not necessarily linear. Further, the negative phase values on the dotted lines are practically identical to the corresponding positive values on the dashed line. They only differ in that the sign is inverted.

As can be seen in FIG. 7, before calibration the phases of the base-band signals provided by the RX channels RX2, RX4, and RX 5 do not lie on the desired characteristic curve. In the present example, the phases of the base-band signals provided by the RX channels RX3 are on the desired characteristic curve (in the present example, these phases define the position of the characteristic curve on the ordinate axis). However, this is not necessarily the case. Once the phases have been determined, the phase offset from the dashed line (which is the linear characteristic curve in the present example) can be determined for the RX channels of each slave MMIC. In the example of FIG. 7 the phase offset is $\Delta\phi_{RX2}$ for the RX2 channels of slave MMIC 2, $\Delta\phi_{RX4}$ for the RX4 channels of slave MMIC 4, and $\Delta\phi_{RX5}$ for the RX4 channels of slave MMIC 4. In the present example, the phase offset $\Delta\phi_{RX3}$ for the reference MMIC (slave MMIC 3) is used as a reference (offset may be equal to zero). As mentioned, this may be different in other embodiments.

Based on the determined phases ($\phi_{RX2.1}$, etc. for RX2 channels, $\phi_{RX3.1}$, etc. for RX3 channels, etc.) of the base band signals, the phase offsets $\Delta\phi_{RX2}$, $\Delta\phi_{RX3}$, $\Delta\phi_{RX4}$, and $\Delta\phi_{RX5}$ can be determined (see FIG. 7) and the control inputs of the respective phase shifters included in the output channels TX1.1, TX1.3, and TX1.4 of the master MMIC 1 can be adjusted—dependent on the determined phase offsets $\Delta\phi_{RX2}$, $\Delta\phi_{RX4}$, and $\Delta\phi_{RX5}$—such that the phases of the base band signals match the predefined characteristic curve (phase-over-antenna position characteristic). In this context "match" means that, after adjusting the control inputs of the phase shifters, the phases of the base band signals lie on the characteristic curve (within a certain tolerance range) as shown in FIG. 8.

The control input of the phase shifters included in the output channels TX1.1, TX1.3, and TX1.4 define the phase shifts $\Delta\phi_{1.1}$, $\Delta\phi_{1.3}$, and $\Delta\phi_{1.4}$ provided by the respective phase shifters (cf. equations 2-5). To compensate for the above-mentioned offsets the phase shifts may be set as follows: $\Delta\phi_{1.1}=-\Delta\phi_{RX2}$, $\Delta\phi_{1.2}=-\Delta\phi_{RX3}=0$, $\Delta\phi_{1.3}=-\Delta\phi_{RX4}$, and $\Delta\phi_{1.4}=-\Delta\phi_{RX5}$, wherein negative phase shifts may be converted into equivalent positive phase shifts by adding 360 degrees. After the above-described first part of the calibration, the phases of the LO signals $s_{LO,2}(t)$, $s_{LO,3}(t)$, $s_{LO,4}(t)$, and $s_{LO,5}(t)$ are calibrated and the RX channels RX2, RX3, TX4, and RX5 use the respective calibrated LO signals. The adjustment of the control inputs of the phase shifters included in the output channels TX1.1, TX1.2, TX1.3, and TX1.4 may be effected by the system controller 50, which controls the operation of the overall system as well as the calibration procedure.

Figure 9:
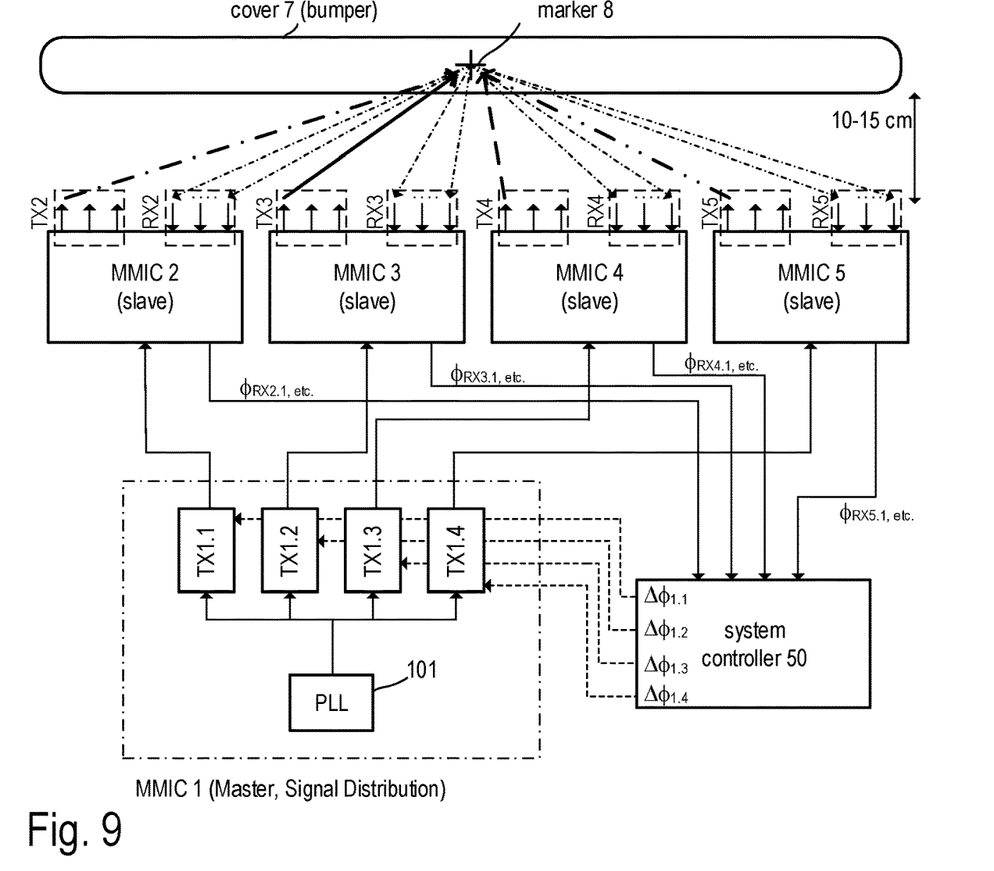
FIG. 9 illustrates the system of FIG. 6 with calibrated phases of the LO signals received by the slave MMICs.

FIG. 9 is basically the same as FIG. 6. However, in addition to FIG. 6 the example in FIG. 9 additionally illustrates how the system controller 50 sets the control inputs of the phase shifters included in the output channels TX1.1, TX1.2, TX1.3, and TX1.4 of the master MMIC 1 based on the measured phases of the base band signals provided by the RX channels of the individual slave MMICs 2, 3, 4, and 5. In the above-described first part of the calibration procedure only the first output channel TX3.1 of the slave MMIC 3 (reference channel) has been used for transmitting a radar signal to the marker 8. In the second part of the calibration procedure, the first output channels TX2.1, TX4.1, and TX5.1 sequentially radiate a radar signal to the marker 8, while all RX channels again receive the resulting radar echoes. Again, the phases of the base band signals provided by the RX channels can be determined using as such known methods.

Figure 10:
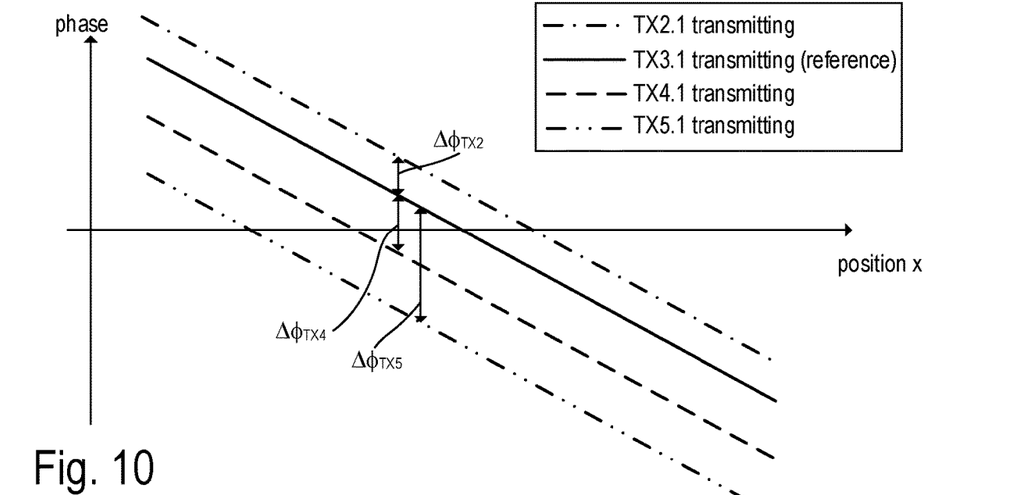
FIG. 10 illustrates the phase offsets from the desired phase-over-antenna position characteristic (see FIG. 8) measured in the second calibration step, in which the phases of the radiated RF output signals are calibrated.

As, in the first part of the calibration, only the TX3.1 channel (reference channel) was radiating a radar signal, the desired situation shown in FIG. 8 (all phases match the desired characteristic curve) will be generally not achieved when the TX channels (e.g. TX2.1, TX4.1 or TX5.1) of other slave MMICs are used instead for radiating a radar signal. At this stage of the calibration procedure, the phase shifters included in the TX channels of the slave MMICs (e.g. TX2.1, TX4.1 or TX5.1) still receive default values (e.g. zero) at their control inputs. Therefore, the calibration process continues with the first output channel TX2.1 of slave MMIC 2 radiating a radar signal. In this case, the resulting phases of the base band signal will not lie on the desired characteristic curve but rather exhibit a phase offset $\Delta\phi_{TX2}$ with respect to the desired characteristic curve (i.e. the desired phase-over-antenna position characteristic). Similarly, a phase offset $\Delta\phi_{TX4}$ will occur, when output channel TX4.1 of slave MMIC 4 is radiating, and phase offset $\Delta\phi_{TX5}$ will occur, when output channel TX5.1 of slave MMIC 5 is radiating a radar signal. This situation is illustrated in FIG. 10. Naturally, the phase offset $\Delta\phi_{TX3}$ is zero as the respective output channel TX3.1 has been selected as reference channel. The second part of the calibration process aims at compensating these phase offsets $\Delta\phi_{TX2}$, $\Delta\phi_{TX4}$, and $\Delta\phi_{TX5}$.

Figure 11:
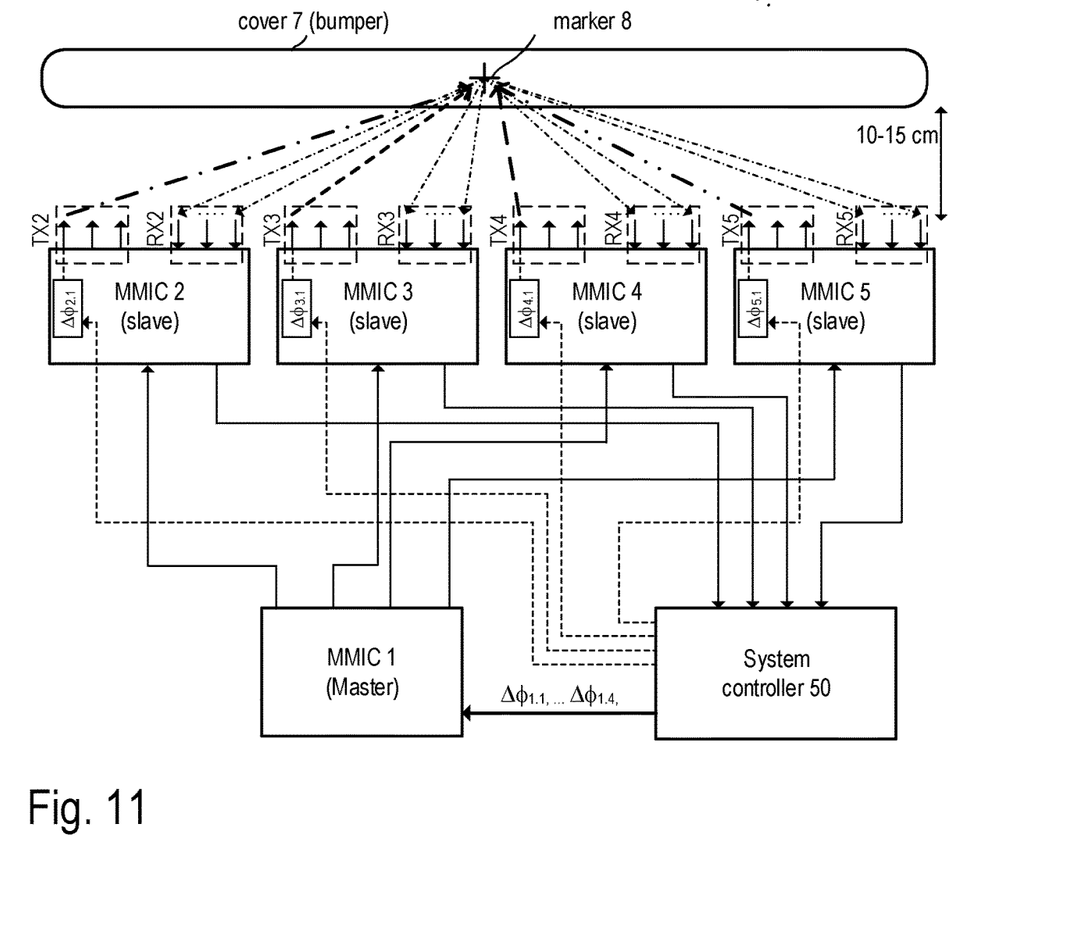
FIG. 11 illustrates the system of FIG. 9 with calibrated phases of the RF output channels connected to respective transmit antennas.

In order to compensate the phase offsets $\Delta\phi_{TX2}$, $\Delta\phi_{TX4}$, and $\Delta\phi_{TX5}$ the control inputs of the phase shifters included in the TX channels TX2.1, TX4.1 and TX5.1 of the slave MMICs 2, 4, and 5 are adjusted. Compensation can be achieved when the control input $\Delta\phi_{2.1}$ of the phase shifter of the output channel TX2.1 is set to $-\Delta\phi_{TX2}$, the control input $\Delta\phi_{4.1}$ of the phase shifter of the output channel TX4.1 is set to $-\Delta\phi_{TX4}$, and the control input $\Delta\phi_{5.1}$ of the phase shifter of the output channel TX5.1 is set to $-\Delta\phi_{TX5}$. This situation is illustrated in FIG. 11, which is basically the same as FIG. 9, except that the phase shifters of the TX channels in the slave MMICs 2, 3, and 5 have been calibrated.

Every MMIC 2, 3, 4, and 5 may include internal calibration routine where e.g. TX2.1 (already calibrated as described above) is now used as reference and channels TX2.2 to TX2.4 may be calibrated using the internal phase shifters of each TX channel to achieve internal phase alignment within the respective MMIC.

Figure 12:
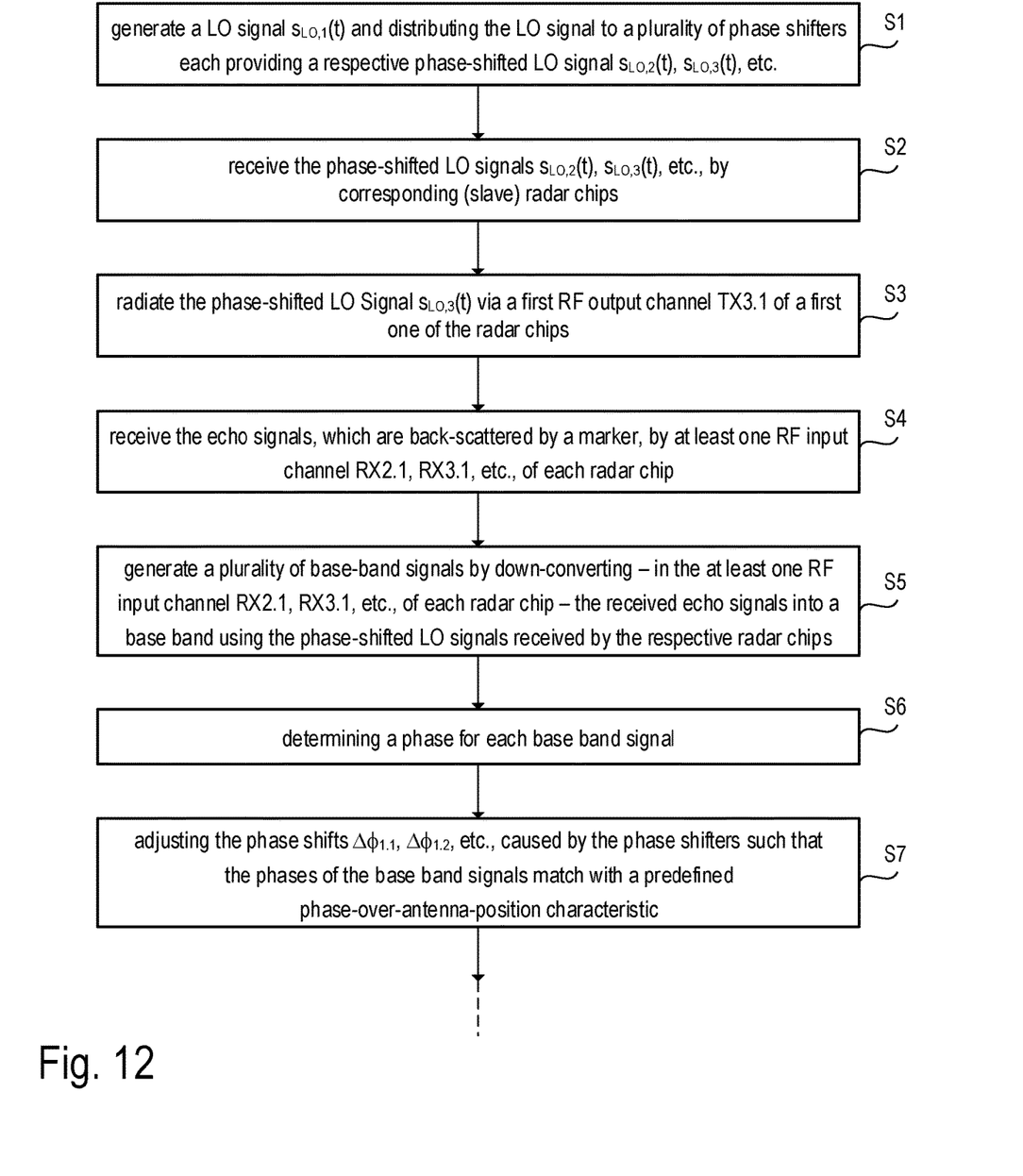
FIG. 12 is a flow chart illustrating one embodiment of a phase calibration used in the radar systems described herein.

One example of the calibration method described above is now summarized with reference to the flow chart shown in FIG. 12. In the radar systems described herein, the method (e.g. the sequence of steps and the signal flow) may be controlled by the system controller 50 (see FIGS. 6, 9 and 11). For this purpose, the system controller may include a processor that is capable of executing software instructions that cause the system controller or implement the method. It is understood that, although not explicitly shown in all the figures, the system controller is able to communicate with the radar chips (master MMIC 1 and slave MMICs 2-5) via suitable communications links such as an LVDS link, an SPI bus or the like. Part of the control mechanisms may be, however, implemented directly in the radar MMICs 1-5. For the calibration method described herein, it is not particularly relevant, in which component the control mechanisms are implemented, and how the communication between the individual chips is implemented.

According to FIG. 12 the method includes (FIG. 12, step S1) the generation of an RF oscillator signal, i.e. the LO signal $s_{LO,1}(t)$ in the examples described herein, and the distribution of the LO signal $s_{LO,1}(t)$ to a plurality of phase shifters. Each phase shifter provides a respective phase-shifted LO signal $s_{LO,2}(t)$, $s_{LO,3}(t)$, $s_{LO,4}(t)$, and $s_{LO,5}(t)$. In the example shown in FIGS. 6 and 9, these phase shifters are included in the output channels TX1.1, TX1.2, TX1.4 and TX1.4 of the master MMIC 1. One example of how a phase shifter is arranged in an output channel is illustrated in FIG. 4 (see FIG. 4, phase shifter 103). The phase shifts $\Delta\phi_{1.1}$, $\Delta\phi_{1.2}$, $\Delta\phi_{1.3}$, and $\Delta\phi_{1.4}$ effected by the phase shifters can be calibrated by adjusting the control inputs to the respective phase shifters as explained below.

The calibration method further includes (FIG. 12, step S2) receiving the phase-shifted LO signals $s_{LO,2}(t)$, $s_{LO,3}(t)$, $s_{LO,4}(t)$, and $s_{LO,5}(t)$ by corresponding radar chips (see FIG. 6, slave MMICs 2-5 receive the phase-shifted LO signals). In each radar chip, the received LO signal is supplied to the RF output channels included in the radar chip. Further, in each radar chip, the received LO signal is used in the input channel included in the radar chip to down-convert antenna signal received from the reception antennas. Accordingly, method further includes (FIG. 12, step S3) radiating the phase-shifted LO signal (e.g. $s_{LO,3}(t)$) via a first RF output channel of a first one of the radar chips (e.g. channel TX3.1 of MMIC 3). Of course, the LO signal is amplified before being radiated by the transmission antenna coupled to the respective output channel. The radiated signal is then back-scattered at a marker, which has a predetermined position relative to the antennas coupled to the radar-chips (see FIG. 6, marker 8). The back-scattered signals (echo signals) can thus be received by at least one RF input channel of each radar chip (FIG. 12, Step S4), e.g. by input channels RX2.1, RX3.1, RX4.1 and RX5.1 of slave MMICs 2-5 in the example of FIGS. 6 and 9. In one specific example all RF input channels of the radar chips are used to receive echo signals.

The received echo signals are processed in the RF input channels as described above with reference to FIG. 4. Accordingly, the method includes (FIG. 12, step S5) generating a plurality of base-band signals (denoted as y(t) in FIG. 4) by down-converting—in the at least one RF input channel of each radar chip (e.g., RX2.1, . . . , RX3.1, . . . , RX4.1, . . . , RX5.1, . . . )—the received echo signals into the base band using the phase-shifted LO signals $s_{LO,2}(t)$, $s_{LO,3}(t)$, $s_{LO,4}(t)$, and $s_{LO,5}(t)$ received by the respective radar chips for the down-conversion (cf. FIG. 4, the pre-amplified echo signal is mixed with the LO signal). In the next step (FIG. 12, step S6) the phase of each base-band signal is determined using known techniques. In FIG. 9, these phases are denoted as $\phi_{RX2.1}$, $\phi_{RX3.1}$, $\phi_{RX4.1}$, and $\phi_{RX5.1}$. In one embodiment, the base-band signals are digitized and the phases are determined by digital signal processing, which may include the calculation of Fourier Transforms of the digitized signals. The phase can then be derived from the Fourier Transforms. However, other concepts for determining the phases exist. The implementation of the phase measurement is not of particular relevance for the present explanations.

The actual calibration is achieved in the next step (FIG. 12, step S7) according to which the phase shifts $\Delta\phi_{1.1}$, $\Delta\phi_{1.3}$, $\Delta\phi_{1.4}$ caused by the phase shifters (that provide the phase-shifted LO signals) are adjusted such that the phases of the base band signals match with a predefined phase-over-antenna-position characteristic. As illustrated in FIGS. 7 and 8, the phase-over-antenna-position characteristic (characteristic curve) may have the form of a straight line, i.e. the relation between phases and respective antenna positions is linear plus a constant offset. Once again, it is noted that the characteristic curve is not necessarily straight; the characteristic curve is, however, predefined and represents the desired position for each antenna.

When the calibration procedure described above has been completed, the phase shifts $\Delta\phi_{1.1}$, $\Delta\phi_{1.3}$, $\Delta\phi_{1.4}$ caused by the phase shifters in the signal distribution circuit (i.e. in the master MMIC 1) are calibrated. As during the calibration only one RF output channel of one radar chip has been used (e.g. channel TX3.1 of MMIC 3 in the example of FIG. 9 referred to as reference channel), a similar calibration procedure can be performed for the other radar chips. One example is summarized with reference to the flow chart of FIG. 13.

Figure 13:
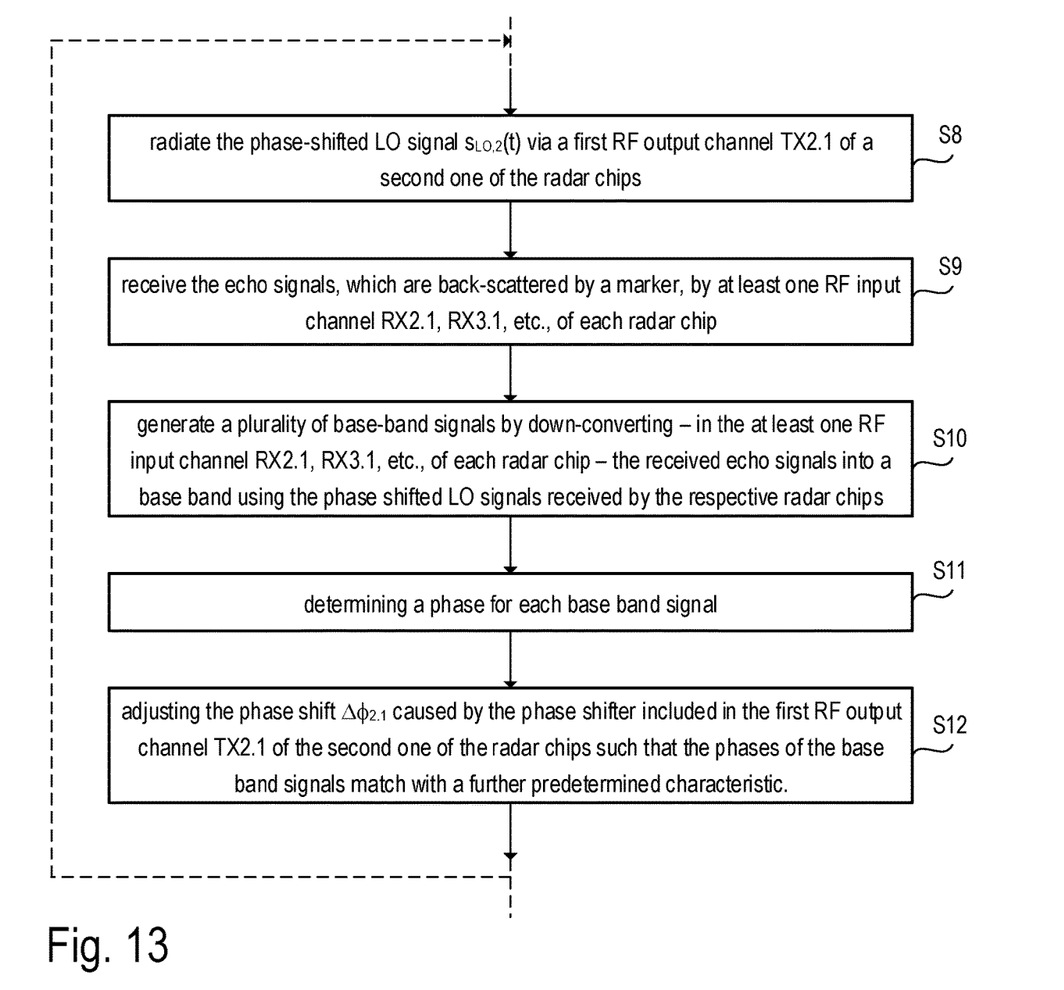
FIG. 13 is a flow chart illustrating one embodiment of a further phase calibration used in the radar systems described herein.

According to FIG. 13, the method includes (FIG. 13, step S8) radiating the phase-shifted LO signal (e.g. $s_{LO,2}(t)$) via a first RF output channel of a second one of the radar chips (e.g. channel TX2.1 of MMIC 2). As mentioned, the LO signal is amplified before being radiated by the transmission antenna coupled to the respective output channel. The radiated signal is then back-scattered at the mentioned marker. The back-scattered signals (echo signals) can thus be received by at least one RF input channel of each radar chip (FIG. 13, Step S9), e.g. by input channels RX2.1, RX3.1, RX4.1 and RX5.1 of slave MMICs 2-5 in the example of FIG. 11. As mentioned, all RF input channels of the radar chips may be used to receive echo signals.

The received echo signals are processed in the RF input channels as described above with reference to FIG. 4. Accordingly, the method includes (FIG. 13, step S10) generating a plurality of base-band signals (denoted as y(t) in FIG. 4) by down-converting—in the at least one RF input channel of each radar chip (e.g., RX2.1, . . . , RX3.1, . . . , RX4.1, . . . , RX5.1, . . . )—the received echo signals into the base band using the phase-shifted LO signals $s_{LO,2}(t)$, $s_{LO,3}(t)$, $s_{LO,4}(t)$, and $s_{LO,5}(t)$ received by the respective radar chips for the down-conversion. In the next step (FIG. 13, step S11) the phase of each base-band signal is determined using known techniques. The mentioned steps S10 and S11 are basically the same as the corresponding steps S5 and S6 illustrated in FIG. 12.

The actual calibration is achieved in the next step (FIG. 13, step S12) according to which the phase shift $\Delta\phi_{2.1}$ caused by the phase shifter included in the first output channel of the second one of the radar chips (i.e. channel TX2.1 of MMIC 2 in the present example) is adjusted such that the phases of the base band signals match a predefined phase-over-antenna-position characteristic. As illustrated in FIG. 10, the predetermined phase-over-antenna-position characteristic (characteristic curve) of step S7 (FIG. 12) and the further predetermined phase-over-antenna-position characteristic of step S12 (FIG. 13) may be identical (see solid line in FIG. 10). However, this is not necessarily the case. The further predetermined phase-over-antenna-position characteristic used in the FIG. 13, step 12, may be different, e.g. have a phase offset as compared to the predetermined phase-over-antenna-position characteristic used in the FIG. 12, step S7.

FIG. 13 illustrates the calibration of the phase shift $\Delta\phi_{2.1}$ caused by the phase shifter included in the first output channel of the second one of the radar chips (e.g. channel TX2.1 of MMIC 2). As indicated by the dashed arrow in FIG. 1, this calibration procedure may be repeated for all further radar chips (e.g. MMIC 4 and 4) except the radar chip included the reference channel.

Figure 14:
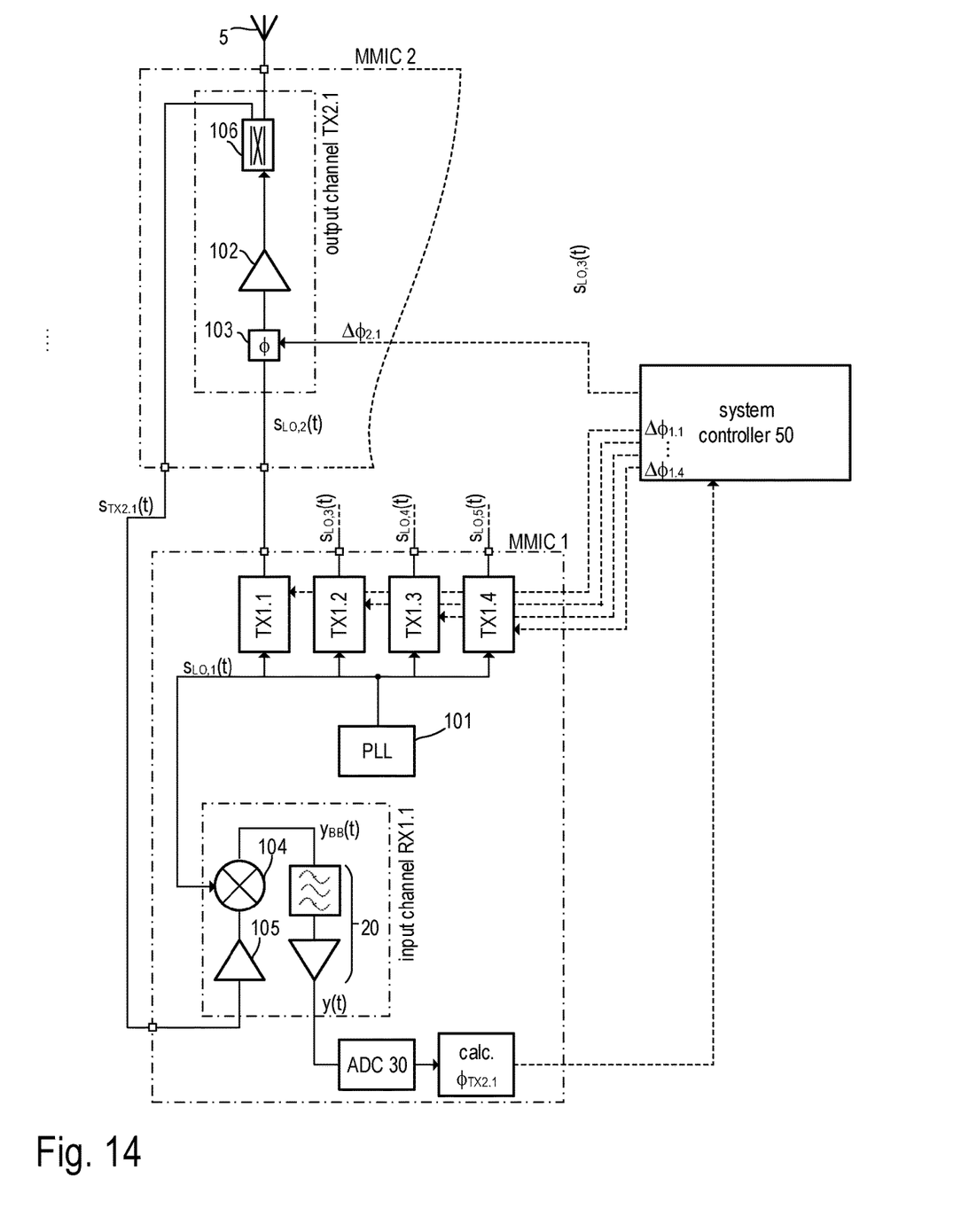
FIG. 14 illustrates part of the system shown in FIGS. 9 and 11 in more detail, particularly with regards to the monitoring of the phases of the RF output signals.

FIG. 14 illustrates part of the system shown in FIGS. 9 and 11 in more detail. The additional circuitry included in the example of FIG. 14 allow for a monitoring of the phases of the RF output signals of the output channels TX2.1, TX3.1, TX4.1, and TX5.1 of the slave MMICs 2-5. It is noted that in FIG. 14 all circuit components that are not important for the further explanations have been omitted for the sake of clarity of the illustration. Further, only slave MMIC 2 is shown in FIG. 14. The other slave MMICs 3, 4, and 5 are substantially the same as slave MMIC 2. The output channel TX2.1 of slave MMIC 2 includes a phase shifter 103 that applies an additional phase-shift of $\Delta\phi_{2.1}$ to the LO signal $s_{LO,2}(t)$, which is received at an LO input of slave MMIC 2. The output of phase shifter 103 is coupled to an input of RF power amplifier 102, and the amplified signal is directed to the antenna 5 which is connected to an RF output (antenna port) of the output channel TX2.1 via a directional coupler 106. The directional coupler 106 is arranged close to the antenna port and configured to branch off a small portion of the power of the outgoing antenna signal, which is denoted as $s_{TX2.1}(t)$ in FIG. 14. Therefore, the RF signal $s_{TX2.1}(t)$ is basically a scaled and phase-shifted version of the LO signal $s_{LO,2}(t)$. In other words, the directional coupler 106 is used to tap the (phase-shifted and amplified) LO signal at the RF output of output channel TX2.1 in order to provide the feedback signal $s_{TX2.1}(t)$.

The RF signal $s_{TX2.1}(t)$ is fed back to the master MMIC 1 and is supplied to a corresponding RF input channel RX1.1 included in the master MMIC 1. In the same way, a feedback signal $s_{TX3.1}(t)$ from output channel TX3.1 of slave MMIC 3 can be fed back to RF input channel RX1.2 of the master MMIC 1, a feedback signal $s_{TX4.1}(t)$ from output channel TX4.1 of slave MMIC 4 can be fed back to RF input channel RX1.3 of the master MMIC 1, and a feedback signal $s_{TX5.1}(t)$ from output channel TX5.1 of slave MMIC 5 can be fed back to RF input channel RX1.4 of the master MMIC 1 (not shown in FIG. 14).

In the input channel RX1.1 the feedback signal $s_{TX2.1}(t)$ may be amplified (see FIG. 14, optional amplifier 105) and down-converted into the base band using the LO signal $s_{LO,1}(t)$ provided by the local oscillator 101. As explained in more detail above with reference to FIG. 4, the down-conversion is accomplished by the mixer 104. The mixer output signal $y_{BB}(t)$ is processed by the analog base-band signal processing chain 20, which basically includes a filtering and a further amplification. The resulting base-band signal $y(t)$ is supplied to an analog-to-digital converter 30, and the phase $\phi_{TX2.1}$ of the base-band signal $y(t)$ is calculated using digital signal processing techniques already mentioned further above. In the same way, the phases $\phi_{TX3.1}$, $\phi_{TX4.1}$, and $\phi_{TX5.1}$ can be calculated based on the feedback signals from the MMICs 3-5.

At the end of the calibration procedure discussed above with reference to FIGS. 12 and 13 the phases $\phi_{TX2.1}$, $\phi_{TX3.1}$, $\phi_{TX4.1}$, and $\phi_{TX5.1}$ are determined based on the corresponding feedback signals $s_{TX2.1}(t)$, $s_{TX3.1}(t)$, $s_{TX4.1}(t)$, and $s_{TX5.1}(t)$ and stored, e.g. in a memory included in the system controller. Alternatively, the memory for storing the phases may be included in the master MMIC 1. The specific implementation of the memory is not of particular relevance for the present explanations. During normal radar operation of the calibrated radar system the phases $\phi_{TX2.1}$, $\phi_{TX3.1}$, $\phi_{TX4.1}$, and $\phi_{TX5.1}$ can be repeatedly measured (monitored), e.g. after a restart/power-on of the radar system, regularly in given time intervals, or at the occurrence of specific events such as a detected temperature change. When at least one of phases has changed by more than a predetermined phase shift as compared to the respective phase values stored after the preceding calibration, a recalibration can be triggered.

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

What is claimed is:

1. A method, comprising:
   generating a radio frequency (RF) oscillator signal;
   distributing the RF oscillator signal to a plurality of phase shifters each providing a respective phase-shifted RF oscillator signal of a plurality of phase-shifted RF oscillator signals;
   distributing each of the plurality of phase-shifted RF oscillator signals to a different radar chip of a plurality of radar chips;
   transmitting a first phase-shifted RF oscillator signal of the plurality of phase-shifted RF oscillator signals via a first RF output channel of a first radar chip, the first phase-shifted RF oscillator signal being back-scattered at a marker as a first back-scattered signal, the marker having a predetermined position relative to antennas coupled to the plurality of radar chips;
   receiving the first back-scattered signal by at least one RF input channel of each of the plurality of radar chips;
   generating a first plurality of base-band signals by down-converting, in the at least one RF input channel of each of the plurality of radar chips, the first back-scattered signal into a base band using the plurality of phase-shifted RF oscillator signals received by the plurality of radar chips;
   determining a phase for each base-band signal of the first plurality of base-band signals; and
   adjusting phase shifts provided by the plurality of phase shifters such that the phase of each base-band signal of the first plurality of base-band signals matches a predefined phase-over-antenna-position characteristic.

2. The method according to claim 1, further comprising:
   determining an offset of the predetermined phase-over-antenna-position characteristic based on phases of base-band signals of the first plurality of base-band signals provided by the at least one RF input channel of the first radar chip.

3. The method according to claim 1, wherein the phase-over-antenna-position characteristic represents a linear relationship between phase and respective antenna position plus an offset.

4. The method according to claim 1, further comprising:
   transmitting a second phase-shifted RF oscillator signal via a first RF output channel of a second radar chip, the transmitted second phase-shifted RF oscillator signal being back-scattered at the marker as a second back-scattered signal;
   receiving, the second back-scattered signal by the at least one RF input channel of each of the plurality of radar chips;
   generating a second plurality of base-band signals by down-converting, in the at least one RF input channel of each of the plurality of radar chips, the second back-scattered signal into the base band using the plurality of phase-shifted RF oscillator signals received by the plurality of radar chips;

determining a phase for each base-band signal of the second plurality of base-band signals; and adjusting a phase shift of a further phase shifter included in the first RF output channel of the second radar chip so that the phases of each base-band signal of the second plurality of base-band signals matches a further predetermined phase-over-antenna-position characteristic.

5. The method of claim 4, wherein the further predetermined phase-over-antenna-position characteristic equals the predetermined phase-over-antenna-position characteristic.

6. The method of claim 4, further comprising:

measuring the phase of the first phase-shifted RF oscillator signal transmitted via the first RF output channel of the first radar chip;

measuring the phase of the second phase-shifted RF oscillator signal transmitted via the first RF output channel of the second radar chip;

storing the respective measured phases; and repeating the measurements of the phases and signaling when at least one of phases has changed by more than a predetermined phase shift as compared to the respective stored phases.

7. The method of claim 6, wherein measuring the phase of the first phase-shifted RF oscillator signal comprises:

tapping the first phase-shifted RF oscillator signal at an output port of the first RF output channel of the first radar chip using a directional coupler;

down-converting the tapped first phase-shifted RF oscillator signal into the base band by mixing it with the RF oscillator signal; and determining the phase of the resulting base-band signal.

8. A radar system, comprising:

a master radar chip;

a plurality of slave radar chips each having at least one radio frequency (RF) output channel coupled to respective transmit antennas and at least one RF input channel coupled to respective receive antennas;

an RF oscillator included in the master radar chip and configured to generate an RF oscillator signal;

a signal distribution circuit included in the master radar chip, the signal distribution circuit configured to receive the RF oscillator signal from the RF oscillator, distribute the RF oscillator signal to a plurality of phase shifters which are configured to impose a phase shift to the RF oscillator signal to generate phase-shifted RF oscillator signals, and output the phase-shifted RF oscillator signals to the plurality of slave radar chips, wherein the signal distribution circuit is configured to distribute each of the phase-shifted RF oscillator signals to a different slave radar chip of a plurality of slave radar chips, wherein the at least one RF output channel of each slave radar chip is configured to transmit an RF radar signal that is based on the phase-shifted RF oscillator signal received by the respective slave radar chip; and a cover having a marker with a predefined position relative to the respective transmit antennas and the respective receive antennas;

wherein RF input channels of the plurality of slave radar chips are configured to receive RF radar signals back-scattered at the marker and down-convert the received RF radar signals into a base band using the phase-shifted RF oscillator signal received by the respective slave radar chips thus generating a base-band signal for each RF input channel of each slave radar chip; and a controller circuit configured to:

determine a phase of each one of the base-band signals, and adjust the phase shifts caused by the phase shifters of the signal distribution circuit such that the phases of the base-band signals match a predetermined phase-over-antenna-position characteristic.

9. The radar system of claim 8, wherein the controller circuit includes circuitry integrated in different semiconductor chips.

10. The radar system of claim 8, wherein at least one RF output channel of each slave radar chip includes a directional coupler configured to provide, as a feedback signal, a fraction of the power of the RF oscillator signal tapped at an output port of the respective RF output channel.

11. The radar system of claim 10, wherein:

the master radar chip includes one RF input channel for each slave radar chip, each RF input channel being configured to receive the respective feedback signal, to down-convert the feedback signal into the base-band by mixing with the RF oscillator signal, and to provide a corresponding base-band signal, and the controller circuit is configured to determine the phases of the base-band signals provided by the RF input channels and to store the determined phases values in a memory.

12. The radar system of claim 11, wherein the controller circuit is configured to monitor, during normal radar operation, the phases of the base-band signals provided by the RF input channels and to signal when at least one of phases has changed by more than a predetermined phase shift as compared to the respective stored phase values.

* * * * *